United States Patent
Langevin

[19]

[11] Patent Number: 5,938,278
[45] Date of Patent: Aug. 17, 1999

[54] NOSE-LESS BICYCLE SEAT WITH HIP RESTRAINTS

[76] Inventor: Kenneth Langevin, 781 Rustic La., Cheshire, Conn. 06410

[21] Appl. No.: 09/100,685

[22] Filed: Jun. 19, 1998

[51] Int. Cl.[6] ............................................. B62J 1/00
[52] U.S. Cl. .................................. 297/215.16; 297/195.1; 297/215
[58] Field of Search ............................ 297/215.16, 195.1, 297/195.11, 202, 215.11, 215.13, 215, 215.1

[56] References Cited

U.S. PATENT DOCUMENTS

| 645,412 | 3/1900 | Wilgus | 297/215 |
|---|---|---|---|
| 4,176,880 | 12/1979 | Marchello | 297/195.14 |
| 4,572,575 | 2/1986 | Golden et al. | 297/195 |
| 4,773,705 | 9/1988 | Terranova | 297/195 |

FOREIGN PATENT DOCUMENTS

| 15015 | of 1894 | United Kingdom | 297/215 |
|---|---|---|---|
| 14149 | of 1897 | United Kingdom | 297/195.1 |
| 10877 | of 1903 | United Kingdom | 297/215.1 |

*Primary Examiner*—Laurie K. Cranmer
*Attorney, Agent, or Firm*—St. Onge Steward Johnston & Reens LLC

[57] ABSTRACT

A bicycle seat comprising a laterally elongated plate and hip restraints extending upwardly and laterally outwardly from opposite lateral ends of the elongated plate. The elongated seat provides comfort to a rider while the hip restraints provide lateral support to the rider's hips.

10 Claims, 2 Drawing Sheets

NOSE-LESS BICYCLE SEAT WITH HIP RESTRAINTS

FIELD OF THE INVENTION

The present invention relates generally to a seat. More particularly, the present invention relates to a bicycle seat, or saddle, that provides extraordinary comfort, while also providing excellent support and control. In another aspect, the present invention relates to a seat assembly including a seat having the above characteristics.

BACKGROUND OF THE INVENTION

Bicycles have been in use for many years throughout the world as a means of transportation for short trips, recreation, exercise and sports competition. In fact, even today, the bicycle is still the primary source of transportation in much of the world. Over the course of this century, the bicycle has evolved into a sleek, light-weight, fast and convenient means of transportation, capable of efficiently transferring energy from a bicycle rider's legs to wheels of the bicycle. Unfortunately, however, bicycle seats, or saddles, although much improved, have not evolved to provide the bicycle with a degree of comfort that is preferred.

Conventional bicycle seats include a "nose," or a portion that extends forward and is shaped to fit between a rider's legs. It has long been acknowledged that the nose of a bicycle seat is uncomfortable and tends to abrade the legs of a rider. In addition, recent medical studies have linked a higher incidence of impotency among men with long-term bicycle riding. One theory for the higher incidence of impotence is that the nose of a bicycle seat puts pressure on, and thus restricts blood circulation in, the crotch area of a bicycle rider. Thus, in addition to simply being uncomfortable, the nose of a bicycle seat may actually cause medical problems to some bicycle riders.

The nose of the seat, however, provides the rider with the ability to control the bicycle. In general, a rider controls the bicycle through the seat, handle bars and pedals. The nose of the seat facilitates orientation by the rider of his or her position on the seat and provides leverage for a rider's thighs for readjusting the rider's position and balancing the rider and the bicycle. Thus while the nose of the seat provides much of the discomfort associated with bicycle riding, the nose also provides much of the ability to control the bicycle.

The problem with prior attempts to improve the comfort of bicycle seats is that, while such seats may provide extraordinary comfort, they do not necessarily provide control or a sense of control. U.S. Pat. No. 4,773,705 to Terranova, for example, discloses a bicycle seat which does not include a nose, but is contoured for supporting engagement with a rider's buttocks. While the seat is apparently extraordinarily comfortable, it may not provide adequate control.

Accordingly, there remains a need to provide a bicycle seat that provides extraordinary comfort to a rider while adequately facilitating control of the bicycle by the rider.

SUMMARY OF THE INVENTION

A general object of the present invention, therefore, is to provide a bicycle seat which provides extraordinary comfort to a rider, yet facilitates control of the bicycle.

The present invention meets these and other objects by providing a bicycle seat comprising a laterally elongated plate, and hip restraints extending upwardly and laterally outwardly from opposite lateral ends of the elongated plate. The elongated seat provides comfort to a rider while the hip restraints provide lateral support to the rider's hips.

These and other desirable objects and advantages of the invention will in part appear hereinafter and will in part become apparent after consideration of the specification with reference to the accompanying drawings.

BRIEF DESCRIPTION OF THE DRAWINGS

For a fuller understanding of the nature and desired objects of the invention, reference should be made to the following detailed description taken in connection with the accompanying drawings wherein like reference numerals denote corresponding parts throughout the several views and wherein.

DETAILED DESCRIPTION OF THE INVENTION

Referring to FIGS. 1 through 4, the present invention provides a nose-less bicycle seat 10 having hip restraints 12. Since the seat 10 does not have a nose, as is commonly provided with bicycle seats, the seat according to the present invention is extraordinarily comfortable. In addition, since the seat 10 is provided with hip restraints 12, a rider's hips are laterally (side-to-side) restrained while the rider is seated, such that the seat according to the present invention provides at least the same level of control normally provided by a seat having a nose.

Figure 1:
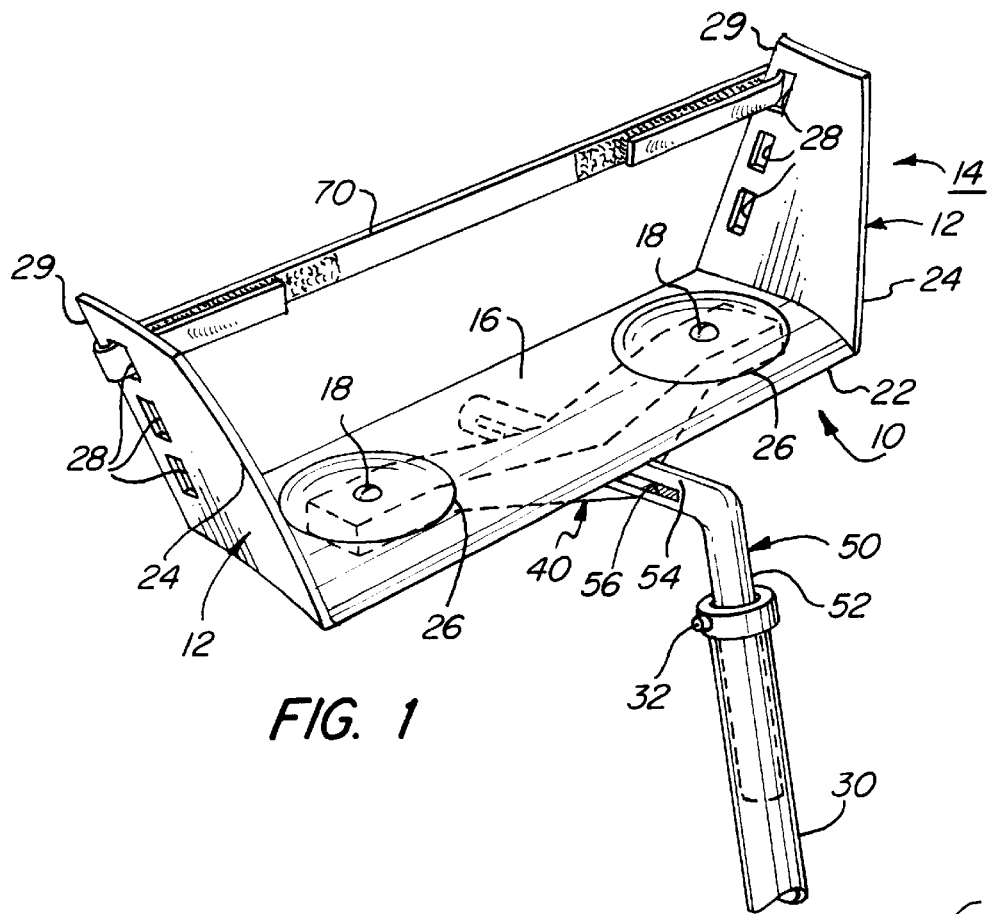
FIG. 1 is an isometric view of a bicycle seat assembly according to the present invention shown secured in a standard seat post of a bicycle.
Figure 2:
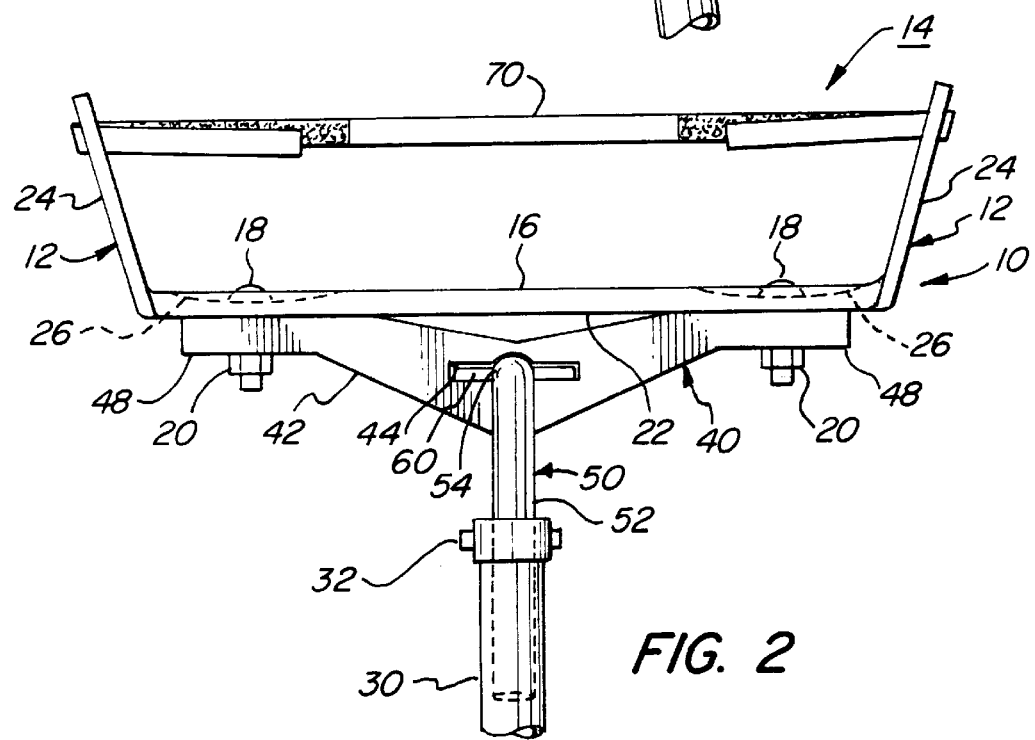
FIG. 2 is a front elevation view of the seat assembly of FIG. 1.
Figure 3:
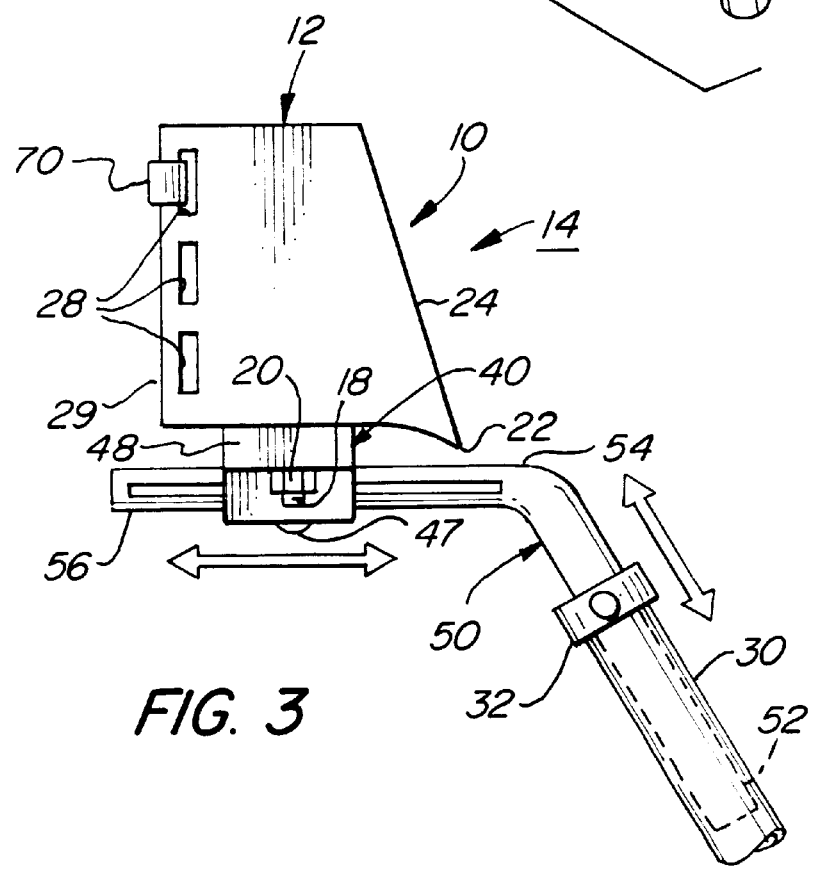
FIG. 3 is a side elevation view of the seat assembly of FIG. 1.

The seat 10 is provided as part of a seat assembly 14 for mounting on a standard seat post 30 of a bicycle. In addition to the seat 10, the assembly 14 includes a frame 40 and an attachment 50. The seat 10 is secured to the frame 40 and the frame is adjustably secured to the attachment 50. The attachment 50 can then be adjustably secured in the seat post 30 of the bicycle, as shown in FIGS. 1 through 3, such that the seat assembly 14 is mounted to the bicycle.

The attachment 50 preferably is a metal tube bent into first and second sections 52, 54. The first section 52 slides into and is secured, in a typical fashion such as with a clamp 32, in the seat post 30 of the bicycle. As is normal, the attachment 50 can be vertically adjusted by loosening the clamp 32, sliding the first section 52 up and down within the seat post 30 a preferred position, and then re-tightening the clamp. The second section 54 extends generally perpendicular from the first section 52. Preferably, the first and the second sections 52, 54 are at an angle of about 115° with respect to each other.

The frame 40 includes a laterally extending V-shaped midsection 42 having a centrally located opening 44 longitudinally (front-to-back and vice versa) receiving the second section 54 of the attachment 50. The V-shaped midsection 42 acts as a spring to provide shock-absorption for the seat 10. The frame 40 can be longitudinally adjusted with respect to the attachment 50 by sliding the frame along the second section 54, and is secured in the preferred position on the attachment with a screw 46. End sections 48 laterally extend from opposite lateral ends of the midsection 42.

The frame 40 is preferably formed of a substantially rigid, light-weight material such as, for example, polycarbonate. While other materials such as wood, metal and combinations thereof can be used, plastic materials can be readily molded to the desired configuration and are therefore preferable. Although not shown, the underside of the frame 40 is preferably hollowed out wherever possible and reinforced with ribs to provide the necessary strength while saving on material and weight.

Figure 4:
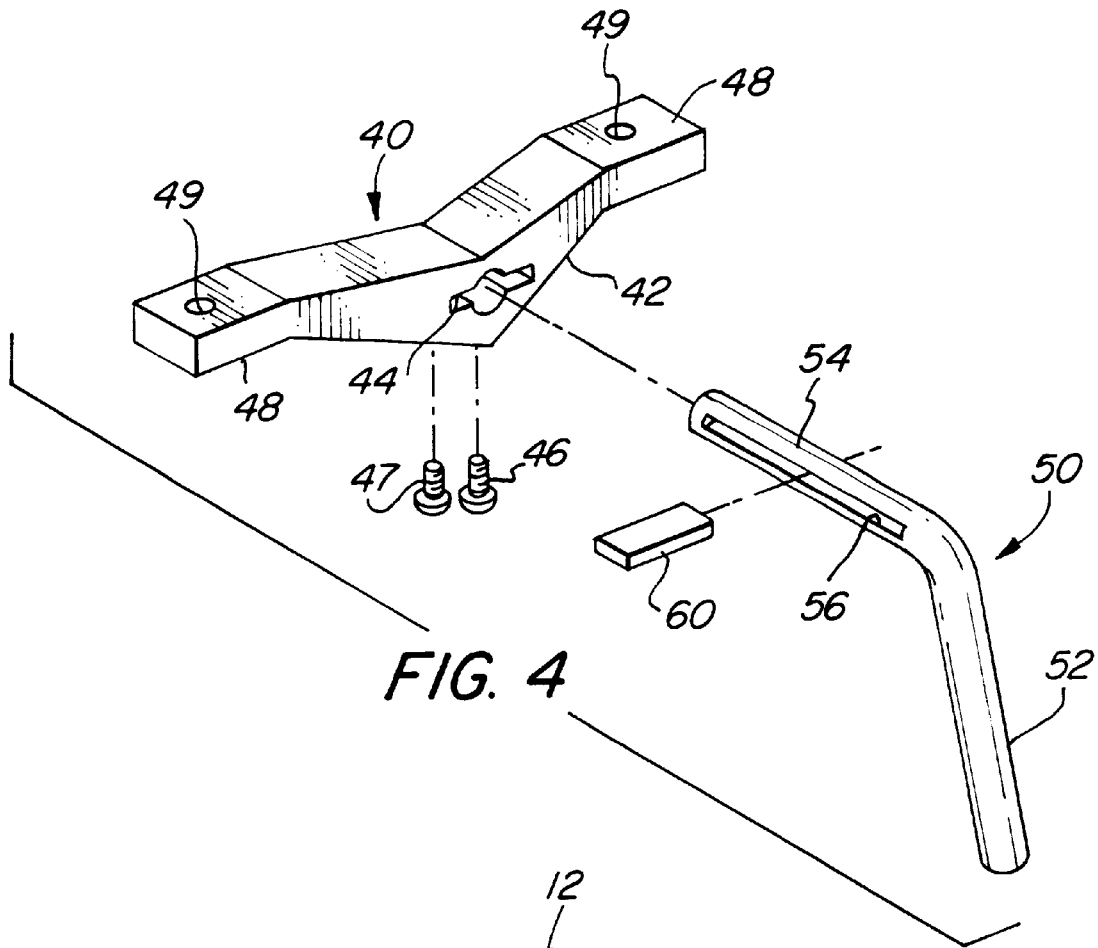
FIG. 4 is an exploded view of an attachment and a frame of the seat assembly of FIG. 1.

Preferably, the assembly 10 includes a key 60 for preventing the frame 40 from rotating on the attachment 50. The key 60, which is preferably rectangular, extends laterally through two parallel, elongated longitudinal slots 56 located on opposite sides of the second section 54 of the attachment 50 such that the key extends from both sides of the second section. (Only one of the slots 56 is shown in FIGS. 1, 3, and 4, but the second slot corresponds to the first slot and is positioned on the hidden side of the attachment 50.) The key 60 is able to slide longitudinally within the slots 56. The centrally located opening 44 of the frame 40 is shaped to receive both the second section 54 of the attachment 50 and the laterally extending key 60, and a screw 47 is provided for securing the key in a position on the second section corresponding to the position of the frame on the second section.

The seat 10 includes a laterally elongated plate 16 secured to the end sections 48 of the frame 40. As shown, the assembly 10 includes bolts 18, which extend though holes in the plate 16 and holes 49 of the end sections 48 of the frame 40, and are secured with nuts 20. However, it should be understood that the plastic frame 40 could include unitarily formed studs extending upwardly from the end sections 48. The studs could then extend through the holes in the seat plate 16, and ends of the studs could be deformed, or mushroomed, by heating into heads for securing the seat 10 to the frame 40.

The hip restraints 12 extend upwardly from opposite lateral ends of the elongated plate 16. The hip restraints 12 extend high enough such that the hip restraints will be positioned adjacent a rider's hips when the rider is seated on the plate 16. As an example, the seat 10 may be provided with a plate 16 having a width of 14 inches, while each hip restraint 12 would have an overall height of 4 inches.

The plate 16 and the hip restraints 12 are preferably a unitary piece formed of a substantially rigid, lightweight material such as, for example, polycarbonate. While other materials such as wood, metal and combinations thereof can be used, plastic materials can be readily molded to the desired configuration and are therefore preferable.

It is intended that the present invention covers a seat similar to the seat 10 of FIGS. 1 through 3, but having hip restraints that are separate from and laterally adjustable with respect to a plate of the seat. However, it has been found that a unitarily formed seat 10, as shown in FIGS. 1 through 3, is more preferable than a seat having laterally adjustable hip restraints because the unitarily formed seat is less expensive and weighs less. It is intended that different sized unitarily formed seats 10 will be provided for different sized riders, such that a seat having laterally adjustable hip restraints will not be needed.

The seat 10 is preferably provided with other comfort features. First, the hip restraints 12 are angled such that they extend upwardly and laterally outwardly from the lateral ends of the plate 16. Preferably each restraint 12 extends at an angle of about 120° with respect to the plate 16. The restraints 12 are angled such that they more easily and comfortably receive a rider's buttocks and hips. Also, a front edge 22 of the plate 16 is flared downwardly, and front edges 24 of the restraints 12 are flared laterally outwardly. In addition, the plate 16 includes circular depressions 26 on a top surface, around each bolt hole. The depressions allow the heads of the bolts 18 to be recessed below the top surface, and provide a more comfortable contour for a rider's buttocks.

Each hip restraint 12 includes spaced-apart slots 28 along a back edge 29. The assembly 10 can be provided with one to three straps 70 (one is shown) for extending between corresponding slots 28 of the restraints 12 to provide rear support for a rider. The strap 70 preferably has Velcro hook and loop covered ends for quick, easy and adjustable attachment of the strap to the seat 10.

While the invention has been described with respect to a preferred embodiment, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A nose-less bicycle seat comprising:

a seat bottom;

hip restraints extending upwardly from opposite lateral ends of said seat bottom, such that said hip restraints will be positioned adjacent a rider's hips when the rider is seated on the bicycle seat, and wherein each of said hip restraints includes at least one slot along a back edge thereof; and at least one strap extending between the slots in said hip restraints.

2. The nose-less bicycle seat according to claim 1 wherein said hip restraints are unitarily formed with said seat bottom.

3. The nose-less bicycle seat according to claim 2 wherein said seat bottom and said hip restraints are integrally molded from a plastic material.

4. The nose-less bicycle seat according to claim 1 wherein said seat bottom has a front edge flared downwardly and a top surface contoured to receive a rider's buttocks, and wherein said hip restraints are flared laterally outwardly.

5. A nose-less bicycle seat comprising:

a seat bottom having a front edge flared downwardly and a top surface contoured to receive a rider's buttocks;

hip restraints extending upwardly from opposite lateral ends of said seat bottom, such that said hip restraints will be positioned adjacent a rider's hips when the rider is seated on the bicycle seat, each of said hip restraints including at least one slot along a back edge thereof; and, at least one strap extending between the slots in said hip restraints.

6. The nose-less bicycle seat according to claim 5 wherein said seat bottom and said hip restraints are integrally molded from a plastic material.

7. A bicycle seat assembly comprising:

an attachment having a first section for sliding into and being secured in a seat post of a bicycle, and a second section extending at an obtuse angle from the first section;

a frame including a laterally extending midsection, the midsection having an opening longitudinally receiving the second section of said attachment, the second section of said attachment being adjustably secured within the midsection, said frame also including end sections laterally extending from opposite lateral ends of the midsection;

a seat including a seat bottom attached to the end sections of said frame, said seat also including hip restraints extending upwardly from opposite lateral ends of the seat bottom, such that the hip restraints will be positioned adjacent a rider's hips when the rider is seated on said seat, each of the hip restraints including at least one slot along a back edge thereof; and at least one strap extending between the slots in the hip restraints of said seat.

8. The bicycle seat assembly according to claim 7 wherein the hip restraints of said seat are unitarily formed with seat bottom of said seat.

9. The bicycle seat assembly according to claim 8 wherein the seat bottom of said seat and the hip restraints of said seat are integrally molded from a plastic material.

10. The bicycle seat assembly according to claim 7 wherein the seat bottom of said seat has a front edge flared downwardly and a top surface contoured to receive a rider's buttocks, and wherein the hip restraints of said seat are flared laterally outwardly.

\* \* \* \* \*